United States Patent
Mortensen et al.

(10) Patent No.: US 10,805,692 B1
(45) Date of Patent: Oct. 13, 2020

(54) CONCURRENT CHANNELS OF COMMUNICATION

(71) Applicant: UNITED SERVICES AUTOMOBILE ASSOCIATION (USAA), San Antonio, TX (US)

(72) Inventors: Maland Mortensen, San Antonio, TX (US); Teddy J. Voutour, Helotes, TX (US); Emily Gray, San Antonio, TX (US); Andrew Anaruk, San Antonio, TX (US); Christopher T. Wilkinson, San Antonio, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 749 days.

(21) Appl. No.: 15/144,626

(22) Filed: May 2, 2016

Related U.S. Application Data

(63) Continuation of application No. 14/031,888, filed on Sep. 19, 2013, now Pat. No. 9,329,757.
(Continued)

(51) Int. Cl.
*H04N 21/81* (2011.01)
*H04N 21/41* (2011.01)
(Continued)

(52) U.S. Cl.
CPC ..... *H04N 21/8186* (2013.01); *H04N 21/2668* (2013.01); *H04N 21/4113* (2013.01); *H04N 21/4126* (2013.01); *H04N 21/44227* (2013.01); *H04N 21/4532* (2013.01); *H04N 21/475* (2013.01); *H04N 21/4781* (2013.01);
(Continued)

(58) Field of Classification Search
CPC ........... H04N 21/812; H04N 21/25891; H04N 21/44222; H04N 21/8186; H04N 21/2668; H04N 21/4113; H04N 21/4126; H04N 21/44227; H04N 21/4532; H04N 21/475; H04N 21/4781; H04N 21/8133; H04N 21/8173; G06Q 30/0241; H04H 20/106; H04H 20/103
See application file for complete search history.

(56) References Cited

U.S. PATENT DOCUMENTS 6,339,438 B1  1/2002  Bates et al.
7,849,476 B2  12/2010  Stevens et al.
(Continued)

OTHER PUBLICATIONS

Design and Implementation for Interactive Augmented Broadcasting System, 2008, Junghak Kim et al., IEEE Transactions on Broadcasting (vol. 60, Issue: 2, pp. 217-226) (Year: 2008).*

(Continued)

*Primary Examiner* — James T Tsai
(74) *Attorney, Agent, or Firm* — Perkins Coie LLP

(57) ABSTRACT

The present disclosure provides systems, methods, and machine-readable media for concurrent communication. One method includes displaying an interactive application on a first device of a user during a break in an entertainment segment displayed on a second device, sending a request for interaction from the user through the interactive application, pausing the interactive application when the break in the entertainment segment is over, and notifying the user when an additional break begins so the user can commence interacting with the interactive application.

19 Claims, 3 Drawing Sheets

Related U.S. Application Data

(60) Provisional application No. 61/864,006, filed on Aug. 9, 2013.

(51) Int. Cl.
  *H04N 21/478* (2011.01)
  *H04N 21/475* (2011.01)
  *H04N 21/2668* (2011.01)
  *H04N 21/45* (2011.01)
  *H04N 21/442* (2011.01)

(52) U.S. Cl.
  CPC ....... *H04N 21/812* (2013.01); *H04N 21/8133* (2013.01); *H04N 21/8173* (2013.01)

(56) References Cited

U.S. PATENT DOCUMENTS

| | | |
|---|---|---|
| 8,447,361 B1 | 5/2013 | Andrus et al. |
| 9,412,120 B1 * | 8/2016 | Bitoun ............... G06Q 30/0267 |
| 10,049,402 B1 * | 8/2018 | Miranda ................. G06Q 20/40 |
| 2002/0038455 A1 * | 3/2002 | Srinivasan ............. G06Q 30/02 |
| | | 725/35 |
| 2002/0129362 A1 | 9/2002 | Chang |
| 2004/0010806 A1 * | 1/2004 | Yuen ...................... G06Q 30/02 |
| | | 725/136 |
| 2008/0092159 A1 * | 4/2008 | Dmitriev ............ G06Q 30/0269 |
| | | 725/34 |
| 2009/0075737 A1 * | 3/2009 | Harris .................. G06Q 10/109 |
| | | 463/42 |
| 2009/0102973 A1 * | 4/2009 | Harris ................ H04N 5/44591 |
| | | 348/565 |
| 2010/0023965 A1 * | 1/2010 | Malik ................ H04N 21/4126 |
| | | 725/32 |
| 2010/0186022 A1 | 7/2010 | Oulid-Aissa et al. |
| 2010/0273553 A1 | 10/2010 | Zalewski |
| 2012/0084811 A1 | 4/2012 | Thompson et al. |
| 2012/0295686 A1 | 11/2012 | Lockton |
| 2013/0042262 A1 | 2/2013 | Riethmueller |
| 2013/0091013 A1 * | 4/2013 | Wang .................. G06Q 30/0241 |
| | | 705/14.53 |
| 2013/0152125 A1 * | 6/2013 | Xiong .............. H04N 21/25891 |
| | | 725/34 |

OTHER PUBLICATIONS

United States Non-Final Office Action issued in U.S. Appl. No. 14/031,888 dated May 22, 2015.

United States Notice of Allowance issued in U.S. Appl. No. 14/031,888 dated Jan. 6, 2016.

\* cited by examiner

CONCURRENT CHANNELS OF COMMUNICATION

CROSS-REFERENCE TO RELATED APPLICATIONS

This application is a continuation of U.S. application Ser. No. 14/031,888, entitled "Concurrent Channels Of Communication," filed Sep. 19, 2013, issuing as U.S. Pat. No. 9,329,757, which is a Non-Provisional Application that claims the benefit of U.S. Provisional Application No. 61/864,006, filed Aug. 9, 2013, each of which are incorporated herein by reference in their entirety.

TECHNICAL FIELD

The present disclosure relates to methods and systems for concurrent channels of communication.

BACKGROUND

The increasing capabilities of mobile devices, such as wireless access to the Internet, has provided additional access to information for users when not strictly sitting in front of and viewing their desktop computing device. As such, it is more frequent when a computing device user is accessing the Internet while using another electronic device (e.g., a television or second computing device). For instance, a fantasy football player may watch a number of games simultaneously or watch a game and monitor his or her team via the Internet. However, these interactions are initiated by the user without any interaction with a third party to initiate such interactions.

DETAILED DESCRIPTION

Figure 1:
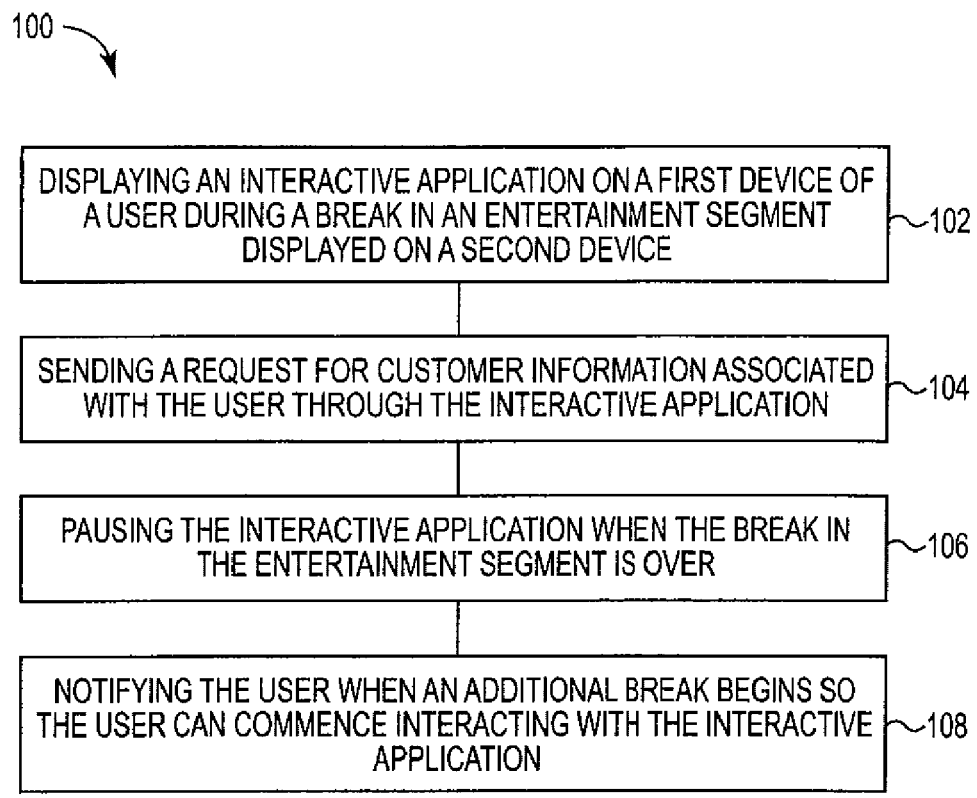
FIG. 1 illustrates a block diagram of an example method for concurrent channels of communication on devices according to one or more embodiments of the present disclosure.

The present disclosure provides method, system, and computer readable medium embodiments for concurrent channels of communication on separate devices. For example, this additional access can be sent to a mobile device concurrent to communication already being received by another device. An application on a mobile device can, for example, include computer software (e.g., executable instructions) for receiving an associated concurrent channel of communication in addition to a device already receiving communication and displaying it to the user. A first device can be displaying information to a user while a second device concurrently displays additional information for the user. For example, a first device can display a first communication while a second device concurrently displays a second communication.

The interactive application can be displayed on a first device during a break in an entertainment segment shown on a second device. An entertainment segment can include a television (TV) show, a reality TV show, a sporting event, a game show, etc. For example, the second device can include a television, a computer, a laptop, a wireless device, a screen, etc.

The interactive application can include information associated or not associated with information on the entertainment segment. For example, a documentary can be shown on a television and a first device can display an interactive application with information about the documentary and/or the subject of the documentary.

In addition, for example, the interactive application can show information not associated with the documentary. The information associated or not associated with the documentary can be shown during a break in the documentary (e.g., during a commercial break in programming).

A user can be notified about an interactive application directly or indirectly via communication from the provider of the additional information. For example, the notification can be provided in forms such as: a magazine ad, a television commercial, a reference on a web site, an advertisement sent to a phone through text and/or email, a blog posting, a social networking forum, etc.

A user can send a request to an interactive application provider to send information on participating via the interactive application. The user can download a native application. The user can use a non-native application on the first device. A user can allow the interactive application to push information to the first device. For example, a user can use settings on a mobile phone to allow a particular application to send information automatically to the mobile phone without the user requesting to initiate the information to be sent.

A notification can include information indicating that the interactive application will be active during particular time periods during an entertainment segment displayed on a second device (e.g., a TV). For example, the notification can state that an application on a phone can activate when a football game being shown on TV turns to a commercial break. The notification can include information that the interactive application will pause when the entertainment segment is being displayed and resume when there is a break from the entertainment segment.

Embodiments of the present disclosure provide an application on a mobile device, that can concurrently display a communication of information to the user while a second device is displaying an additional communication of related and/or non-related information. A mobile device, as used herein, can include a mobile telephone, a tablet, a mobile personal computer, and a personal digital assistant (PDA), among other mobile devices.

Applications can include graphical user interfaces (GUI) for a user to interact with the application on the mobile device. For instance, applications can be used to display an interactive application. An interactive application can include a trivia game, supplemental information to add to the information provided by the communication on a different device, questions related to user information, etc.

A GUI, as used herein, can include a user interface that allows a user to interact with a computing device using images. A user interface can, for example, include a space where interactions between a user and a computing device occur.

A user interface can include hardware components and computer instruction components. For instance, hardware components can include input components (e.g., a mouse, a touch screen, and a keyboard) and output components for the computing device to indicate the effects of user input (e.g., display). A GUI can, for example, represent actions and tasks available to a user through graphical icons and visual indicators.

Concurrent channels of communication on different devices, in accordance with some embodiments of the present disclosure, can provide users with more channels of information. A channel of communication can include interacting with a user to obtain user information.

This user information can provide better products and services for the user. For example, a provider of services could communicate with the user to determine that the user does not currently have one or more particular services, or would benefit from different services than are currently being provided to the user. This determination can allow further communication with the user to notify the user of additional services that the service provider can provide that can benefit the user.

FIG. 1 illustrates a block diagram of an example method 100 for concurrent channels of communication on devices according to one or more embodiments of the present disclosure. At 102, the method 100 can include displaying an interactive application on a first device. An interactive application can include an application to interact with a user. For example, an interactive application can include an application with a trivia game for a user to play. An interactive application can include an application that displays information and/or particular details. The user can interact with the application using a graphical user interface (GUI).

A first application can include a native or non-native application to the first computing device, for example. A native application, as used herein, can include an application designed, developed, and/or created for use on a specific computing environment (e.g., computer language and operating system). The native application can be pre-installed on the first computing device and/or downloaded to the first computing device, for instance.

A first computing device, as used herein, can be a mobile device. For instance, a mobile device can be a mobile cellular telephone, a tablet personal computer, a mobile personal computer, and/or a PDA, among other mobile devices.

As used herein, a second device can include a stationary device. A stationary device can include a computing device that is and/or is not mobile. For example, a stationary device can include a desktop computer. In addition, a stationary device can include a television (TV).

In various embodiments of the present disclosure, a request from the first application can be wirelessly transmitted to a wireless access point of a wireless network. The wireless network can be interconnected to the Internet and/or a physical network.

A physical network can include a computer telephony integration (CTI) system and/or a plurality of computing devices. A CTI, as used herein, can refer to a combination of technologies and processes that enable or provide the integration and coordination of voice and data communications.

At 104, the method can include sending a request for customer information associated with the user through the interactive application. The request for customer information can include a request for a user's name, address, phone number, current insurance information (e.g., car insurance, home insurance, health insurance, etc.), current employment status, etc.

In response to a user sending the requested information, an interactive application can send information related to the user's sent information. For example, a user can respond that the user does not currently have car insurance. The interactive application can send information about car insurance to the user.

The interactive application can display a list of products and/or services for the user to select. Once selected, the interactive application can send the user the selected information. For example, a user can have car insurance but select further information about car insurance rates to compare to their current coverage.

Displaying information and/or selecting information can occur intermittently throughout the interaction between the user and the interactive application. For example, an interactive application can ask a trivia question and receive a response answer from the user. The interactive application can then send a possible list of products and/or services the user can view. In some embodiments, the items on the list can be related to the answer that was provided by the user. Once the products and/or services are viewed, the interactive application can return to the trivia game and ask an additional question.

A request for customer information can include eligibility questions. A request for customer information can include questions related to the user's product usage. A request for customer information can be provided in a trivia format to seamlessly occur alongside the trivia questions.

At 106, the method can include pausing the interactive application when the break in the entertainment segment is over. For example, the entertainment segment can include a football game.

The interactive application can start up once the football game programming displays a commercial. Once the commercial segment is over, the interactive application can pause.

The interactive application can pause during any segment of the entertainment segment. For example, an interactive application can resume when a penalty flag is called during a football game being displayed on a second device (e.g., television). For example, an interactive application can resume when a challenge to a referee call is made by a football coach.

A commercial segment of an entertainment segment can be determined by sensing particular identifiers (e.g., audio, visual cues, etc.). For example, particular words of a commercial can indicate a commercial segment is occurring. A commercial segment can be identified by an administrator that views a display of the entertainment segment and notifies a system when the commercial segment begins. For example, an administrator can be watching the entertainment segment and when a commercial segment begins, the administrator can indicate the beginning of the commercial segment via a computing device. The notification can be a nearly instantaneous notification. The commercial segment can be identified by a device based on cues in the commercial segment and/or audio and/or additional characteristics. The cues can determine when information is pushed to a first device (e.g., device of a user) when a commercial segment begins on a second device (e.g., programming device, television, etc.).

At 108, the method can include notifying the user when an additional break begins so the user can commence interacting with the interactive application. A notification to a user can include a pushed (e.g., forced, sent without prompting, etc.) message to a first device (e.g., a mobile phone, a tablet computer, a laptop computer, etc.).

A notification to a user can, for example, include a text message. A notification to a user can include a text message to a third device (e.g., an additional mobile phone). In some implementations, a notification to a user can include an email to a first device (e.g., a mobile device, a mobile phone, a tablet computer, a laptop computer, etc.). A notification can include a notification on the entertainment segment reminding a user to return to an interactive application.

Figure 2:
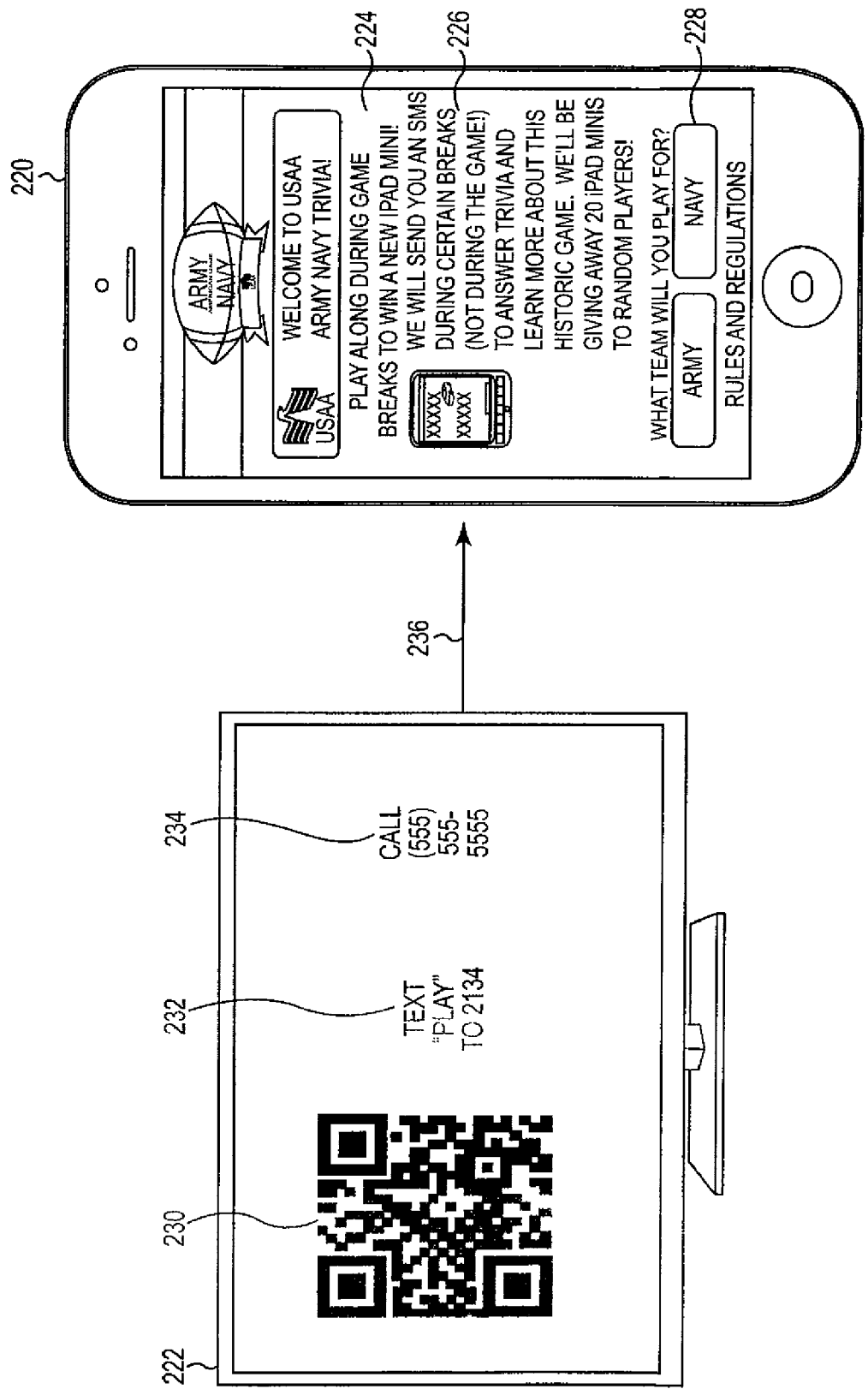
FIG. 2 illustrates an example display on a first user interface of a first computing device receiving a channel of communication concurrent with a second computing device according to one or more embodiments of the present disclosure.

FIG. 2 illustrates an example display on a first user interface of a first computing device receiving a channel of communication concurrent with a second computing device according to one or more embodiments of the present disclosure. As shown in FIG. 2, a first computing device 220 can include communication 236 concurrent with a second computing device 222.

The first computing device 220 can be a mobile device (e.g., a mobile phone, a laptop, a table computer, etc.). The second computing device can include a stationary device or a mobile device (e.g., a mobile phone, a laptop computer, a television, etc.). The first computing device 220 can display an explanation of a trivia game 224. For example, the explanation can include a prize (e.g., a new I-pad mini) to win.

An interactive application that includes a trivia game can be a trivia game among a particular group of people. For example, a group of friends can participate in the interactive application (e.g., trivia game) and can play against one another for a particular prize and/or outcome. The prize can include a discount on a service and/or products. The prize can include a free quote for a person in the group.

The first computing device 220 can display an explanation 226 of how the interactive application will work concurrent with the entertainment segment. The interactive application can include a button and/or buttons 228 to select in order for the user to respond to the interactive application (e.g., select Navy to be on that team).

The second computing device 222 can display a number of ways to connect to the concurrent communication 236. A second computing device 222 can display a scan code 230. The scan code 230 can be scanned by a first computing device 220 in order to display an interactive application on a first computing device 220.

In some embodiments, a second computing device 222 can display directions to text a particular message to a particular phone number 232. Following the directions to text 232 can enable receiving a connection to concurrent communication 236 (e.g., a website link texted to the computing device that texted, an email sent with information to connect, a link to an online location to download an application, etc.).

A second computing device 222 can display a phone number to call 234 in order to gain access to an interactive application. The previous examples are not exhaustive of the plurality of ways in which a second computing device can provide and/or display directions to a user to access an interactive application on a first computing device.

The first computing device 220 can display an interactive application during (e.g., concurrently with) a commercial break displayed on a second computing device. The interactive application can display information related to the commercial break.

In some embodiments, the information related to the commercial break can counter a message in the commercial break. For example, the commercial break can promote a first insurance company. The interactive application can display information explaining why the promotion of the first insurance company is in error or may be misrepresenting facts, for example. The interactive application can compare the promoted first insurance company to a second insurance company and inform a user why the second insurance company has a particular product and/or service that the user may prefer over the product and/or service of the first insurance company.

Figure 3:
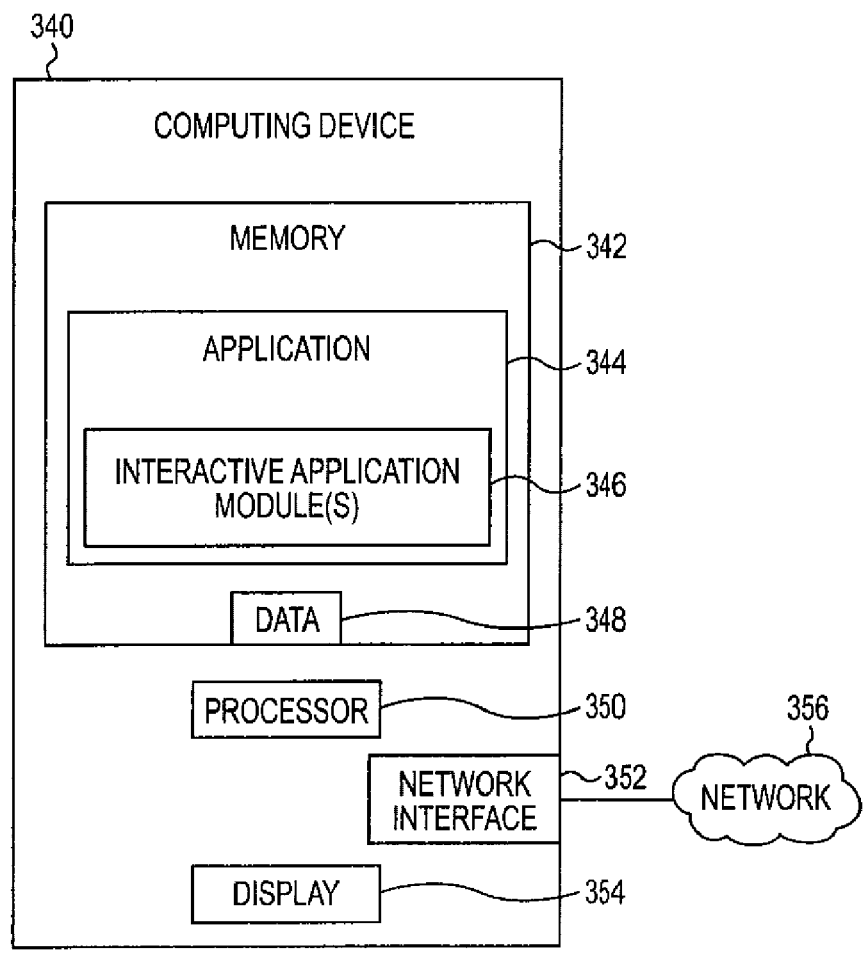
FIG. 3 illustrates a block diagram of an example system according to one or more embodiments of the present disclosure.

FIG. 3 illustrates a block diagram of an example computing system that can be utilized with one or more embodiments of the present disclosure. The computing system can include a computing device 340. A computing device can be, for example, a laptop computer, a desktop computer, and/or a mobile device (e.g., a mobile phone, a personal computing device, a PDA, etc.), among other types of computing devices.

The computing device 340 can include a memory 342 and a processor 350 coupled to memory 342. Memory 342 can be any type of storage medium that can be accessed by processor 350 to perform various examples of the present disclosure (e.g., send first application display data, etc.). For example, memory 342 can be a non-transitory computing device readable medium having computing device readable instructions (e.g., computing device program instructions, machine readable instructions, computer readable instructions, etc.) and data 348 stored thereon.

The computing device readable instructions are executable by processor 350 to perform various examples of the present disclosure. The data 348 can be used (e.g., analyzed by) the computing device readable instructions during their execution.

Memory 342 can be volatile or nonvolatile memory. Memory 342 can also be removable (e.g., portable) memory, or non-removable (e.g., internal) memory. For example, memory 342 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical disk storage, and/or a magnetic medium such as magnetic cassettes, tapes, or disks, among other types of memory.

Further, although memory 342 is illustrated as being located in computing device 340, embodiments of the present disclosure are not so limited. For example, memory 342 can, in addition to or alternatively, be located internal to another computing resource (e.g., enabling computer readable instructions to be downloaded over the Internet or another wired or wireless connection).

The computing device 340 can include a network interface 352. A network interface 352 can connect the computing device 350 to a network, such as network 356 illustrated in FIG. 3.

Network 356 can be a wired or wireless network, such as, for instance, a wide area network (WAN) such as the Internet, a local area network (LAN), a personal area network (PAN), a campus area network (CAN), or metropolitan area network (MAN), among other types of networks. As used herein, a "network" (e.g., network 356) can provide a communication system that directly or indirectly links two or more computers and/or peripheral devices and allows users to access resources on other computing resources (e.g., computing devices and/or data storage devices) and/or exchange messages with other users.

A network can allow users to share resources on their own systems with other network users and to access information on centrally located systems or on systems that are located at remote locations. For example, network 356 can tie a number of computing devices together to form a distributed control network (e.g., permit a computing device to connect to a repository of multimedia files hosted and/or uploaded to a central server by other computing devices accessing the network).

A network may provide connections to the Internet and/or to the networks of other entities (e.g., organizations, institutions, etc.). Users may interact with network-enabled computing device applications to make a network request, such as to get a file or print on a network printer. Applications may also communicate with network management software, which can interact with network hardware to transmit information between devices on the network.

The computing device 350 can include a display (e.g. display 354). A display 354 can include, for example, a screen that can provide (e.g., display and/or present) information to a user of computing device 350. For example, the display 354 can be used to display a user interface.

Additionally, the computing device 340 can receive information from the user of computing device 340 through an interaction with the user via display (e.g., display 354). For instance, the computing device 340 can receive input from the user (e.g., first user) via display 354 (e.g., a touch screen display or via another user input device such as a keyboard in response to interaction with items show on the display). For example, a user can enter the input into the computing device 340 using a mouse and/or keyboard associated with the computing device 340 (e.g., display 354).

The computing device 340 can include an application 344. The application 344 can, for instance, be stored in the memory 342 of the computing device 340. The application 340 can include an interactive application module 346. A module, as used herein, can include program instructions (e.g., computer readable instructions) to perform a particular act, task, and/or function when executed by a processor.

By way of illustration and not by way of limitation, the interactive application module 346 can include a number of instructions (e.g., a number of computer readable instructions) that can be executed by the processor 350 to perform or achieve a particular task and/or complete the task of contacting and/or connecting with (e.g., by text, by email, by a pushed messaged, etc.) a user during a break of an entertainment segment displayed on a second computing device. Contacting and/or connecting with a user can be performed during a displayed entertainment segment on a second computing device to supplement content on the entertainment segment.

In some embodiments of the present disclosure, the interactive application module 346 can include instructions that can be executed by the processor 350 to display an interactive application (e.g., a trivia game, a display of additional information, etc.) that interacts with a user. The instructions can be executed to request user information (e.g., user name, address, telephone number, insurance policy number, etc.).

The user information can be used to determine products and/or services (e.g., an insurance policy) for the user. In some embodiments, the user information can be used to determine if an entity can provide additional products and/or services (e.g., insurance coverage) for the user. The user information can be used to provide additional information about products and/or services (e.g., insurance coverage) and/or contact information (e.g., an entity phone contact, address location, etc.) for the user to request more information.

In some embodiments of the present disclosure, the interactive application module 346 can include instructions that can be executed by the processor 350 to pause when the entertainment segment (e.g., a sports game, a television program, a television movie, etc.) is no longer displaying a break from the entertainment segment (e.g., a displayed commercial break).

As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate the embodiments of the present disclosure and should not be taken in a limiting sense. As used herein, "a" or "a number of" used in referring to a particular thing is intended refer to one or more such things.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, if provided, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, inventive subject matter lies in less than all features of a single disclosed embodiment. Thus, the claims, if provided, are hereby incorporated into the Detailed Description, with each claim standing on its own as a separate embodiment.

What is claimed:

1. A computer-implemented method comprising:
   displaying, by a first device, a first interactive interface configured to receive user information, in response to the first device detecting a commercial segment or a break in an entertainment segment displayed at a second device, wherein the first device detects the commercial segment or the break based upon receiving at least one of a first audio identifier and a first visual identifier from the second device;
   automatically pausing, by the first device, the display of the first interactive interface when the commercial segment or the break ends;
   upon detecting an occurrence of a predetermined event outputted by the second device during the entertainment segment, notifying, by the first device, the user and resuming the first interactive interface by displaying additional requests for user information on the first interactive interface;
   transmitting, by the first device, the user information to a computing device of an entity that uses the user information to identify a first set of one or more products or services to provide the user, the first set of one or more products or services associated with the commercial segment or the entertainment segment; and generating, by the first device, a second interactive interface configured to display a comparison of features of the first set of one or more products or services and corresponding features of a different second set of one or more products or services associated with the commercial segment or the entertainment segment; and notifying the user that the first interactive interface will be active on the first device during the commercial segment or the break in the entertainment segment displayed at the second device.

2. The method according to claim 1, wherein the computing device of the entity is configured to store the user information received from a plurality of first devices associated with a plurality of users.

3. The method according to claim 1, further comprising:
receiving, by the first device, one or more inputs from the second device configured to display one or more segments.

4. The method according to claim 3, further comprising monitoring, by the first device, one or more outputs of one or more types generated by the second device,
wherein at least one output of the one or more outputs generated by the second device corresponds respectively to at least one input of the one or more inputs.

5. The method according to claim 1, further comprising:
detecting, by the first device, a second commercial segment or a second break in the entertainment segment based on receiving at least one of a second audio identifier or a second visual identifier from the second device; and
pausing, by the first device, the second interactive interface upon detecting the second commercial segment or the second break in the entertainment segment.

6. The method according to claim 1, wherein the first graphical user interface is further configured to display an interactive game containing information associated with the commercial segment or the entertainment segment.

7. The method according to claim 1, wherein the first graphical user interface is further configured to display information for the first set of one or more products or services associated with the commercial segment or the entertainment segment.

8. The method according to claim 1, further comprising:
receiving, by the first device, via the first interactive interface the user information to be transmitted to the computing device of the entity.

9. The method according to claim 8, wherein the user information comprises a data field selected from the group consisting of: a customer identifier, a customer phone number, a customer location, a customer social networking profile, a usage of a product, and a usage of a service.

10. The method according to claim 1, wherein the first device is at least one of a mobile device and a personal computing device, and wherein the second device is at least one of a personal computing device and a television.

11. A system comprising:
a first device comprising a processor executing a software application associated with the database, the processor configured to receive one or more inputs of one or more types associated with a second device, and in response to the processor of the first device detecting a start of a commercial segment or a break in an entertainment segment displayed at the second device, wherein the first device detects the commercial segment based upon receiving at least one of a first audio identifier and a first visual identifier from the second device, the processor further configured to:
display a first interactive interface configured to receive user information;
automatically pause the display of the first interactive interface when the commercial segment or the break ends;
upon detecting an occurrence of a predetermined event outputted by the second device during the entertainment segment, notify the user and resume the first interactive interface by displaying additional requests for the user information on the first interactive interface;
transmit the user information to a computing device of an entity that uses the user information to identify a first set of one or more products or services to present to the user via the first device, wherein the first set of one or more products or services are associated with the commercial segment or the entertainment segment; and
generate a second interactive interface configured to display a comparison of features of the first set of one or more products or services and corresponding features of a different second set of one or more products or services associated with the commercial segment or the entertainment segment; and
notify the user that the first interactive interface will be active on the first device during the commercial segment or the break in the entertainment segment displayed at the second device.

12. The system according to claim 11, wherein the computing device of the entity is configured to store the user information received from a plurality of first devices associated with a plurality of users.

13. The system according to claim 11, wherein the second device is configured to display the one or more segments of the one or more types, including at least one of the commercial segment and the entertainment segment, and
wherein the first device comprises one or more input devices configured to receive the one or more types of the one or more inputs from the second device.

14. The system according to claim 13, wherein the first device is further configured to monitor a stream of outputs associated with the second device, and
wherein at least one output of the stream of outputs corresponds respectively to at least one input of the one or more inputs.

15. The system according to claim 11, wherein the first device is further configured to pause the second interactive interface upon detecting a second commercial segment or a second break in the entertainment segment, wherein the first device identifies the second commercial segment or the second break in the entertainment segment based on receiving at least one of a second audio identifier and a second visual identifier received from the second device.

16. The system according to claim 11, wherein the first graphical user interface is further configured to display an interactive game containing information associated with the commercial segment or the entertainment segment.

17. The system according to claim 11, wherein the first graphical user interface is further configured to display information for the first set of one or more products or services associated with the commercial segment or the entertainment segment.

18. The system according to claim 11, wherein the first interactive interface generated by the first device is further configured to receive the user information to be transmitted to the computing device of the entity.

19. The system according to claim 18, wherein the user information comprises a plurality of data fields containing data describing a user, and wherein a data field is selected from the group consisting of: a customer identifier, a customer phone number, a customer location, a customer social networking profile, a usage of a product, and a usage of a service.

* * * * *